US010789655B2

(12) United States Patent
Luongo

(10) Patent No.: US 10,789,655 B2
(45) Date of Patent: *Sep. 29, 2020

(54) AUTOMATED SALES TAX PAYMENT SYSTEM

(71) Applicant: STAC IP, LLC, Wantagh, NY (US)

(72) Inventor: Pino Luongo, Purchase, NY (US)

(73) Assignee: STAC IP, LLC, Wantagh, NY (US)

( * ) Notice: Subject to any disclaimer, the term of this patent is extended or adjusted under 35 U.S.C. 154(b) by 28 days.

This patent is subject to a terminal disclaimer.

(21) Appl. No.: 15/935,757

(22) Filed: Mar. 26, 2018

(65) Prior Publication Data
US 2018/0240199 A1 Aug. 23, 2018

Related U.S. Application Data

(63) Continuation of application No. 14/077,354, filed on Nov. 12, 2013, now Pat. No. 9,928,554, which is a continuation of application No. 13/685,548, filed on Nov. 26, 2012, now Pat. No. 8,583,518, which is a continuation-in-part of application No. 12/859,609, filed on Aug. 19, 2010, now Pat. No. 8,321,281.

(51) Int. Cl.
G06Q 40/00 (2012.01)
G06Q 20/20 (2012.01)
G06Q 30/04 (2012.01)
G06Q 50/12 (2012.01)
G06Q 20/34 (2012.01)
G06Q 20/08 (2012.01)

(52) U.S. Cl.
CPC .......... *G06Q 40/123* (2013.12); *G06Q 20/08* (2013.01); *G06Q 20/204* (2013.01); *G06Q 20/207* (2013.01); *G06Q 20/352* (2013.01); *G06Q 30/04* (2013.01); *G06Q 40/00* (2013.01); *G06Q 40/103* (2013.01); *G06Q 50/12* (2013.01)

(58) Field of Classification Search
CPC .... G06Q 40/123; G06Q 20/08; G06Q 20/204; G06Q 20/207
USPC .... 705/31, 19, 17, 36 R, 36 T, 37, 44, 14.23
See application file for complete search history.

(56) References Cited

U.S. PATENT DOCUMENTS

| 2009/0076941 A1* | 3/2009 | Schneierson | G06Q 20/10 705/37 |
| 2009/0240610 A1* | 9/2009 | Barsade | G06Q 20/04 705/31 |
| 2012/0246038 A1* | 9/2012 | Wilmes | G06Q 20/207 705/31 |

* cited by examiner

*Primary Examiner* — Vanel Frenel
(74) *Attorney, Agent, or Firm* — Leason Ellis LLP

(57) ABSTRACT

Described are technologies relating to transaction processing. In general, one aspect of the subject matter described herein can be embodied in methods that include the actions of calculating, in relation to a transaction, one or more tax amounts associated with a price of the transaction, obtaining, in relation to a payment source, an approval for at least the price of the transaction and the one or more tax amounts, thereby defining an approved sales transaction, and, subsequent to obtaining the approval, (a) settling at least a revenue portion of one or more approved sales transactions in favor of a first account, and (b) settling the one or more tax amounts in favor of a second account that is different than the first account.

12 Claims, 4 Drawing Sheets

| id | sw | type | date | time | check | user | card | card# | exp | appr | amt | tip | total | tip% | tax |
|---|---|---|---|---|---|---|---|---|---|---|---|---|---|---|---|
| 1 | S | A | 05/18/10 | 12:14 | 148360 | 116 | visa | XXX...5970 | .... | 038527 | 37.02 | 8.00 | 45.02 | 23.5 | 3.02 |
| 2 | S | A | 05/18/10 | 12:57 | 148367 | 116 | visa | XXX...3904 | .... | 145351 | 39.74 | 6.00 | 45.74 | 15.1 | 3.24 |
| 3 | S | A | 05/18/10 | 13:01 | 148366 | 165 | mc | XXX...0043 | .... | R00011 | 45.73 | 9.00 | 54.73 | 19.7 | 3.73 |
| 4 | S | A | 05/18/10 | 13:04 | 148370 | 132 | mc | XXX...0934 | .... | 031855 | 84.92 | 16.00 | 100.92 | 18.8 | 6.42 |
| 5 | S | A | 05/18/10 | 13:13 | 148365 | 132 | visa | XXX...2276 | .... | 57184B | 46.27 | 8.00 | 54.27 | 17.3 | 3.77 |
| 6 | S | A | 05/18/10 | 13:33 | 148368 | 113 | visa | XXX...5890 | .... | 445645 | 114.86 | 22.00 | 136.86 | 19.2 | 9.36 |
| 27 | S | A | 05/18/10 | 14:42 | 140419 | 165 | visa | XXX...7788 | .... | 072860 | 21.77 | 21.77 | 3.23 | 25.00 | 14.8 |
| 28 | S | A | 05/18/10 | 14:45 | 148395 | 113 | mc | XXX...0187 | .... | 024514 | 64.78 | 64.78 | 11.00 | 75.76 | 12.0 |

Fig. 4

AUTOMATED SALES TAX PAYMENT SYSTEM

CROSS-REFERENCE TO RELATED APPLICATIONS

This application is a continuation of U.S. patent application Ser. No. 14/077,354, filed Nov. 12, 2013, now U.S. Pat. No. 9,928,554, which is a continuation of U.S. patent application Ser. No. 13/685,548, filed Nov. 25, 2012, now U.S. Pat. No. 8,583,518, which is a continuation-in-part application of U.S. patent application Ser. No. 12/859,609, filed Aug. 19, 2010, now U.S. Pat. No. 8,321,281, which are is incorporated by reference in their respective entireties.

FIELD OF INVENTION

The present systems and methods pertain to retail commerce, and, more particularly, to a transaction processing in settings such as in the restaurant, hospitality and retail industry to manage tax payments in connection with non-cash tender retail transactions.

BACKGROUND OF THE INVENTION

In the retail sector, customers purchase goods and services using cash, credit cards, or debit cards. While some purchases are not subject to taxation, most are. Food and beverage purchases in a restaurant, for example, can be subject to state and local sales taxes.

For each sales transaction that is subject to taxation, a merchant is legally obligated to pay tax at a rate that is set based on the location of the retailer. Thus, in New York City, there may be one rate, whereas in a suburban community outside New York City but still in the state of New York, there may be a different rate. In contrast, the same sales might not be subject to tax at all in a different state or during a state-sponsored promotional period to encourage shopping.

While merchants generally do collect the requisite tax(es), the monies that are collected are often co-mingled with other funds, such as those collected from operation of the retail enterprise. For example, when the sales transaction is made by the customer tendering a transaction card (that is, either a debit or credit card), the merchant receives monies in the form of additions to its bank balance in the amount of the sales price and any taxes collected from the customer.

SUMMARY OF INVENTION

In general, one aspect of the subject matter described herein can be embodied in methods for transaction processing. The method includes the actions of: calculating, in relation to a transaction, one or more tax amounts associated with a price of the transaction, obtaining, in relation to a payment source, an approval for at least the price of the transaction and the one or more tax amounts, thereby defining an approved sales transaction, and, subsequent to obtaining the approval, (a) settling at least a revenue portion of one or more approved sales transactions in favor of a first account, and (b) settling the one or more tax amounts in favor of a second account that is different than the first account.

In another aspect, the method includes the actions of: identifying one or more tax amounts associated with one or more transactions, settling, with one or more processors, a revenue portion of the one or more transactions in favor of a first sub-account of a first account, and settling the one or more tax amounts associated with the one or more transactions in favor of a second sub-account of the first account.

In another aspect, the method includes the actions of: identifying one or more tax amounts associated with one or more transactions, settling, with one or more processors, a revenue portion of the one or more transactions in favor of a first account, and settling the one or more tax amounts associated with the one or more transactions in favor of a first sub-account of a second account, the second account including a plurality of subaccounts.

These and further aspects, features and advantages will become more apparent from the following detailed description when taken in connection with the accompanying drawings.

BRIEF DESCRIPTION OF THE FIGURES

FIG. 4 depicts a screen shot of an interface configured to be used to transfer revenue and tax portions of one or more sales transactions for discrete, non-comingled processing.

DETAILED DESCRIPTION OF CERTAIN EMBODIMENTS

Figure 1:
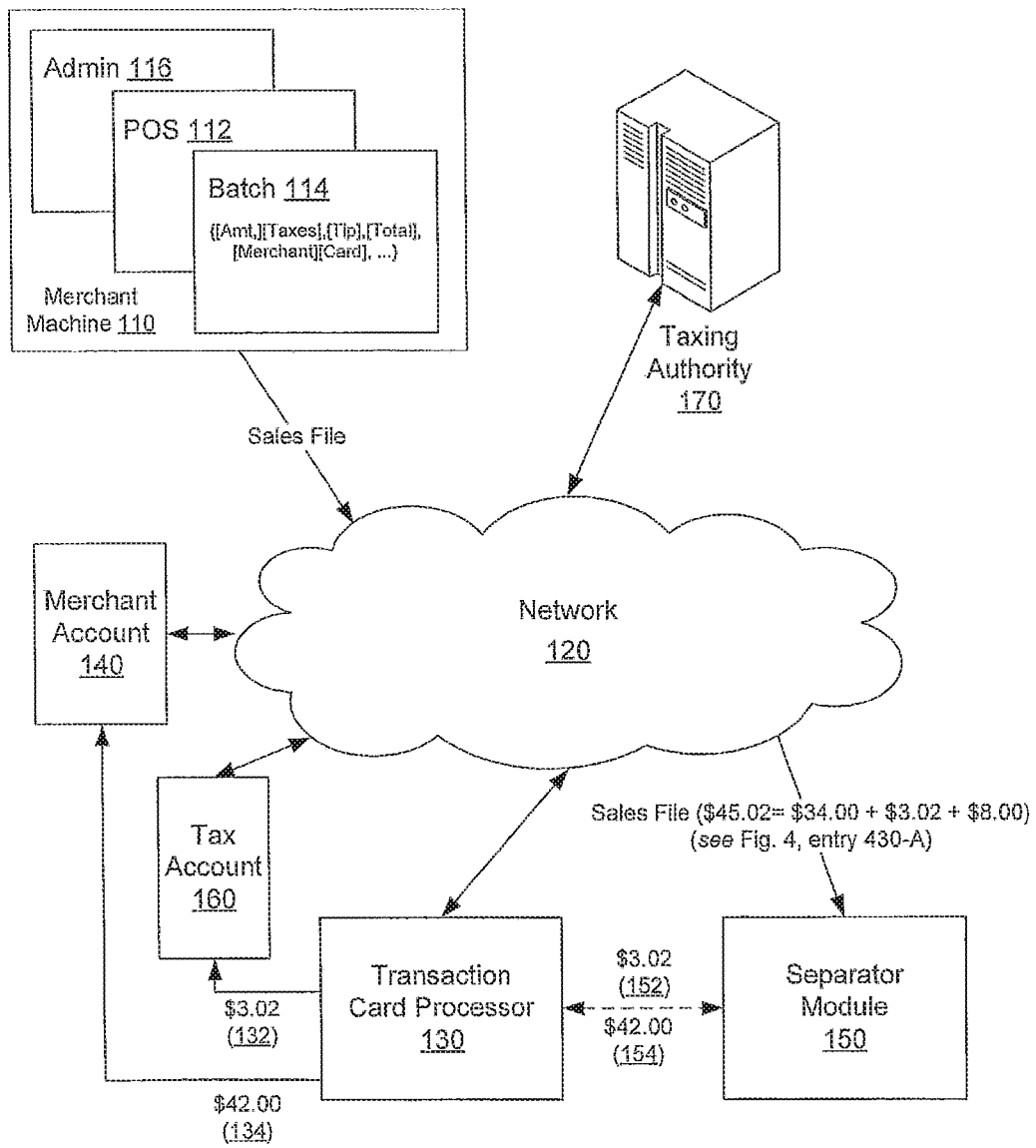
FIG. 1 illustrates a system arrangement in which a merchant machine connects to a transaction processing module, in accordance with one embodiment, prior to processing by a transaction card processor.

By way of overview introduction, the technologies described herein provide improvements in transaction processing by isolating sales revenue from any/all tax(es) collected by the merchant, such as a merchant in the restaurant, hospitality or retail industry. By isolating the sales tax (and/or other taxes) from the revenue portion of a sales transaction, the merchant can manage its business without risk of shortfalls that can result by having the sales tax comingled with sales revenue and provide significant advantages for merchants who are not well schooled in accounting. Moreover, the isolated tax stream can be provided to a taxing authority on a per-transaction, per-day, per-week, or per-month basis, for example, rather than on a quarterly basis, providing significant advantages to the taxing authority.

Accordingly, described herein are systems and methods for transaction processing. The referenced systems and methods are now described more fully with reference to the accompanying drawings, in which one or more illustrated embodiments and/or arrangements of the systems and methods are shown. The systems and methods are not limited in any way to the illustrated embodiments and/or arrangements as the illustrated embodiments and/or arrangements described below are merely exemplary of the systems and methods, which can be embodied in various forms, as appreciated by one skilled in the art. Therefore, it is to be understood that any structural and functional details disclosed herein are not to be interpreted as limiting the systems and methods, but rather are provided as a representative embodiment and/or arrangement for teaching one skilled in the art one or more ways to implement the systems and methods. Accordingly, aspects of the present systems and methods can take the form of an entirely hardware embodiment, an entirely software embodiment (including firmware, resident software, micro-code, etc.), or an embodiment combining software and hardware. One of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer. Furthermore, the terms and phrases used herein are not intended to be limiting, but rather are to provide an understandable description of the systems and methods.

In the description that follows, certain embodiments and/or arrangements are described with reference to acts and symbolic representations of operations that are performed by one or more devices, such as machine 110 of FIG. 1. As such, it will be understood that such acts and operations, which are at times referred to as being computer-executed or computer-implemented, include the manipulation by one or more processors of electrical signals representing data in a structured form. This manipulation transforms the data and/or maintains them at locations in the memory system of the machine/computing device, which reconfigures and/or otherwise alters the operation of the system in a manner understood by those skilled in the art. The data structures in which data are maintained are physical locations of the memory that have particular properties defined by the format of the data. However, while an embodiment is being described in the foregoing context, it is not meant to provide architectural limitations to the manner in which different embodiments can be implemented. The different illustrative embodiments can be implemented in a system including components in addition to or in place of those illustrated herein. Other components shown in FIG. 1 can be varied from the illustrative examples shown. The different embodiments can be implemented using any hardware device or system capable of running program code. In another illustrative example, one or more of the systems described herein can take the form of a hardware unit that has circuits that are manufactured or configured for a particular use. This type of hardware can perform operations without needing program code to be loaded into a memory from a computer readable storage device to be configured to perform the operations.

For example, machine 110 can take the form of a circuit system, an application specific integrated circuit (ASIC), a programmable logic device, or some other suitable type of hardware configured to perform a number of operations. With a programmable logic device, the device is configured to perform the number of operations. The device can be reconfigured at a later time or can be permanently configured to perform the number of operations. Examples of programmable logic devices include, for example, a programmable logic array, programmable array logic, a field programmable logic array, a field programmable gate array, and other suitable hardware devices. With this type of implementation, various software modules can be omitted because the processes for the different embodiments are implemented in a hardware unit.

In still another illustrative example, machine 110 can be implemented using a combination of processors found in computers and hardware units. Such processors can have a number of hardware units and a number of processors that are configured to execute software modules. In this example, some of the processors can be implemented in the number of hardware units, while other processors can be implemented in the number of processors.

In another example, a bus system can be implemented and can be comprised of one or more buses, such as a system bus or an input/output bus. Of course, the bus system can be implemented using any suitable type of architecture that provides for a transfer of data between different components or devices attached to the bus system. Additionally, an integrated or peripheral communications interface can include one or more devices used to transmit and receive data, such as a modem or a network adapter.

Embodiments and/or arrangements can be described in a general context of computer-executable instructions, such as program modules, being executed by a computer. Generally, program modules include routines, programs, objects, components, data structures, etc., that perform particular tasks or implement particular abstract data types.

It should be further understood that while the various computing devices and machines referenced herein, including but not limited to machine 110, are referred to herein as individual/single devices and/or machines, in certain implementations the referenced devices and machines, and their associated and/or accompanying operations, features, and/or functionalities can be arranged or otherwise employed across any number of devices and/or machines, such as over a network connection, as is known to those of skill in the art. It should also be noted that, although not all shown in FIG. 1, various additional components can be incorporated within and/or employed in conjunction with the various computing devices.

In FIG. 1, a merchant machine 110 comprises a computing device or system having network connectivity such as through a wired (e.g., 10/100 Ethernet) or wireless (e.g., IEEE 802.11g) connection to a network 120. Examples of merchant machine 110 include personal computers (e.g., desktop/laptop computers) and/or mobile computing devices (such as tablet computers or smartphones, such as those equipped with peripherals having magnetic stripe readers and/or otherwise having the capability to receive/process payments). The merchant machine includes a processor, memory, and/or one or more input/output devices such as a touch screen display. Code is loaded or otherwise accessible to the processor and executes to configure the processor as a point of sale device, in the case of POS module 112, or as a transaction processor in the case of Batch module 114, or as an editor in the case of the administrative module 116. Additional modules can be provided, as understood by those of skill in the art, so as to support interactivity with the touch screen or other input/output device, to support communications by and between the modules and over the network 120, to manage data, backups, reporting, and so on.

For instance, the code that comprises the POS module(s) 112 can comprise "Dinerware," by Dinerware, Seattle, Wash. This software provides a restaurant POS system featuring ticket handling, order routing, menus, business policies, labor management functionality, and so on. Other POS software can be used in the merchant machine 110 with equal advantage, including, by way of example and not limitation, "PointOS Professional" by PointOS, "Halo" by Vivonet, and "Cash Register Express" by PC America. As another example, the code that comprises the transaction module(s) 114 can comprise "Slipstream" by Midnite Express, Inc. of Myrtle Beach, S.C. The "Slipstream" software provides transaction processing system suitable for multiple credit card, gift, and loyalty card usage, including, in relevant part, batch processing of sales transactions to third-party transaction card processing facilities. The administrative module(s) 116 can comprise code that is a part of the POS or batch software, and generally designates functionality that can support configuration of the interface including the buttons and their labels, password management, licensing, setting of tax rates, pre-set gratuity levels, gift certificate processing, and other settings that the merchant might configure and save in a profile associated with a particular establishment or a chain of retail establishments.

Conventionally, the merchant machine 110 communicates over the network 120 to a transaction card processor 130 which receives a sales file output by the merchant machine and processes one or more sales transactions in the sales file so as to credit a merchant account 140 (which, in certain implementations, can include the data 430 in several rows of the interface 400). Examples of such transaction card processors 130 (who receive such files and perform merchant services such as processing third-party transactions and attending to interchange fees and other service charges, chargebacks and reversals, if any) include: First Data Merchant Data Services Corporation ("First Data"), 5th 3rd, Heartland, American Express CAPN, etc. In certain implementations, the merchant account can be an account at any traditional or online banking institution (e.g., an account having a routing number and/or an account number that can be used to enable funds to be directed from the transaction card processor 130 to a particular account associated with the merchant).

Described herein are various flow diagrams that illustrate routines showing broad aspects of various transaction processing methods in accordance with at least one embodiment disclosed herein. It should be appreciated that several of the logical operations described herein are implemented (1) as a sequence of computer implemented acts or program modules running on one or more machines such as machine 110 and/or (2) as interconnected machine logic circuits or circuit modules within the system(s) described herein. The implementation is a matter of choice dependent on the requirements of the device (e.g., size, energy, consumption, performance, etc.). Accordingly, the logical operations described herein are referred to variously as operations, steps, structural devices, acts, or modules. As referenced above, various of these operations, steps, structural devices, acts and modules can be implemented in software, in firmware, in special purpose digital logic, and any combination thereof. It should also be appreciated that more or fewer operations can be performed than shown in the figures and described herein. These operations can also be performed in a different order than those described herein.

Figure 2:
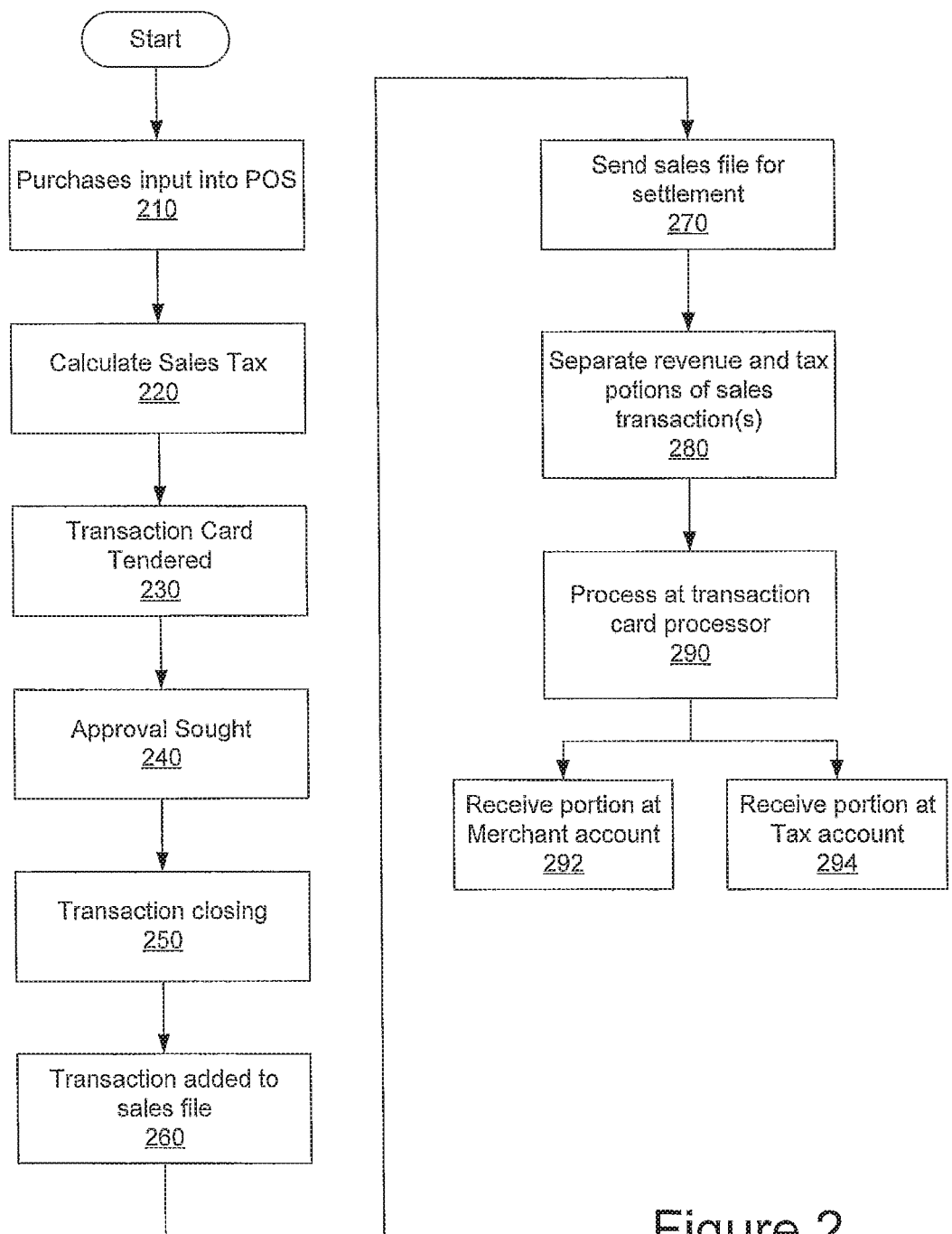
FIG. 2 depicts a flow diagram illustrating a process by which sales transactions are managed.
Figure 3:
FIG. 3 depicts a customer invoice for a sales transaction that has not closed.

Turning briefly to FIG. 2, a first portion of a process flow 200 (steps 210 through step 270) illustrates a conventional sales transaction by a customer with a merchant using a credit card. A customer purchases one or more goods or services from a merchant, such as in a conventional manner. For instance, the purchase can be food (soup, appetizer, drink) from a restaurant. At step 210, the customer's purchase(s)/selection(s) are input into a POS system. As shown in FIG. 3 and referenced above, the POS system can include the aforementioned Dinerware software executing in a computing device located at the site of the restaurant. It can be appreciated with reference to FIG. 3 that the purchases subtotal to $34.00. At step 220, tax is calculated such as by operation of a check presentation module comprising code executing in the machine that implements the POS in relation to the price of a product sold to the customer for the particular location of the retailer. That is, the requisite taxes are calculated (e.g., $3.02), and the calculated amount is added to the subtotal to yield a total amount due ($37.02 in the illustrated example).

If the customer wishes to pay using a transaction card (e.g., a credit/debit card or using any other such electronic payment method such as a virtual wallet), or several transaction cards as when the cost is split among several people, at step 230 the transaction card can be tendered by causing the card to be swiped or otherwise read (e.g., using NFC technology, as is known to those of ordinary skill in the art). In certain implementations, a card/magnetic stripe reader can be connected to or otherwise in communication with the computing device providing the POS functionality, thereby enabling the card reader to transfer transaction card data from a credit card of a customer to a memory of the computing device.

As indicated at step 240, approval of the tendered card is sought such as by communicating over the network 120 to a transaction card processor 130 associated with the particular card that was tendered (e.g., Visa, MasterCard, American Express, etc.). In a conventional manner, the card processor returns a code if the amount sought for approval is within the credit limit of the credit card, or within the parameters permitted for a debit card, if that was the card that was tendered. In the case of restaurants, the approval may be for an amount that exceeds the purchase amount ($37.02) to ensure that a gratuity (e.g., a 15%-20% overage) can be approved in case the customer adds a gratuity to the purchase amount as is customary in certain industries/settings. An approval module comprising code executing in the machine that implements the POS manages the actions necessary to communicate an amount to the transaction processor for approval against the transaction card data that has been read into the memory of the POS machine and to receive an acknowledgement of the approval. This amount, namely, at least the price of the product and the sales tax, defines an approved sale transaction. The acknowledgements can be stored locally at the merchant site or remotely, along with details of the sales transaction with that customer. Among other data concerning the transaction that can be stored are the following (all of which can be part of a sales file later communicated to the transaction processor 130 for settlement):

[Date]
[Time]
[Check]
[User]
[Card]
[Card #]
[Approval]
[Amt.]
[Tax]
[Tip]
[Total]
[Tip %]
[Merchant]
[Other]

If the approval is obtained, then the process flow continues so as to close the transaction, as indicated at step 250. A transaction closing module comprising code executing in the machine that implements the POS operates to fix the total amount of the purchase, any tax, and any gratuities that are being charged to the customer. The transaction closing module can close the sales transaction in an amount up to the approval defined in the approved sale transaction. That total amount, and some or all of the values of the variables listed above, can be included in a row of a table or in a record or other data object that is included in a sales file that is communicated over the network 120 to a transaction card processor, such as at the request of the merchant, as indicated at step 270. The sales file can be sent out by interacting with a settlement control 410 that is provided within the interface (see FIG. 4). The settlement control is selectable by a user of the transaction processing system (e.g., the POS) to trigger a revenue settlement module, a tax settlement module, or both, to cause or otherwise enable a transmission over the network to settle the one or more approved sale transactions. The merchant selects a payment processor, such as one associated with the Visa and Mastercard tenders, for example, by interacting with a check box 420 and can, in a batch mode, send all transactions of that tender type at once, simultaneously (e.g., all of the illustrated transactions in a batch manager window 400). The sales transaction of FIG. 3 is shown in the first row, row 430-A, of FIG. 4. As will be understood from the description that follows, either or both a revenue portion of the sales transaction and applicable sales tax can be sent out by the code of the settlement module, simultaneously, in a batch.

Referring now to FIGS. 1, 2 and 4, in accordance with a salient aspect of the invention, the sales file is processed by a separator module 150 which comprises code executing in a machine and operative to separate sales tax from a revenue portion of the sales transactions. It should be understood that, in various implementations, the separator module can be executed on the machine that implements the POS, or can execute on a different machine accessible to and/or otherwise in communication with the POS over the network 120. For instance, the functionality of the separator module can be a hosted solution that merchants can subscribe to in order to facilitate transaction card processing in a manner that eliminates co-mingling of sales tax with operating revenue.

The code of the separator module 150 comprises a revenue settlement module that is operative to configure the processor of the machine on which it executes to settle a revenue portion of the approved sales transactions included in the sales file. The settlement can be in favor of a first account that is accessible over the network, such as the merchant account 140 which belongs to the merchant. In certain implementations, the revenue portion of the sales transaction can exclude sales tax (or other such taxes or fees), but can include any gratuity or tip, if applicable. It can be appreciated that, in such scenarios, the purchase revenue and any gratuities can be managed by conventional POS software, thereby enabling the merchant to divide tips among waiters and other staff according to their respective customers served, and/or in accordance with other business rules. The code of the separator module 150 also comprises a tax settlement module that is operative to configure the processor of the machine on which it executes to settle any sales tax (or any other such taxes or fees) associated with the approved sales transactions in the sales file. The settlement in this regard can be in favor of a second account accessible over the network, preferably one that is different than the first account. In one implementation, the settlement to the second account can be to an account of a taxing authority 170, such as tax account 160.

Optionally, when the separator module executes within the machine that implements the POS, the settlement control 410 can be configured to trigger a transfer to the transaction processor 130 of just the revenue portion of the sales transaction(s), while a second control 440 can be provided and configured to trigger a transfer to the transaction processor 130 of just the sales tax portion of the sales transaction(s) for tenders of one type or another, such as Mastercard and Visa on the one hand by selecting check box 450 (as shown) or American Express by selecting check box 460.

At this juncture, it should be noted that, in certain implementations, the respective revenue portion(s) and tax portion(s) of a particular approved sales transactions can be settled with respect to a single account (e.g., a bank account as referenced above) having one or more sub-accounts. Such sub-accounts can correspond, for example, to the revenue portions and tax portions of each approved transaction for which payment is received. Accordingly, while the single account remains under the control/authority of the merchant, the funds deposited or otherwise credited to such an account can be segregated into the respective sub-accounts. In doing so, the merchant can immediately ascertain (both with respect to each transaction and with respect to the entirety of the funds deposited/credited to the account) the amount(s) that were properly earned by the merchant (that is, the revenue portion(s)), as well as the amount(s) that, though initially paid to the merchant, are actually tax revenue which is to be paid to a taxing authority (that is, the tax portion(s)). It should also be noted that while the tax portion of respective transactions can be stored within/in relation to a particular sub-account, the referenced sub-account can be 'swept' or otherwise withdrawn at specified intervals (e.g., weekly, monthly, quarterly, etc.). Additionally, in certain implementations, multiple sub-accounts can be implemented, such as with respect to different types of taxes arising from a single transaction (e.g., state tax and city tax, etc.). Moreover, in certain implementations, such sub-accounts can be configured to enable review of/access to a particular sub-account by designated third-parties. For example, a particular taxing authority can be provided the ability to view the contents of those sub-accounts within which funds that are accumulating for payment to the particular taxing authority are segregated. In doing so, the taxing authority can be provided with a real-time tally of tax revenue that is being collected on its behalf, thereby enabling the taxing authority to more accurately budget and project future tax revenue. It should also be noted that, as can be appreciated by those of ordinary skill in the art, the various operations described herein can be easily configured for implementation in such settings, and such configurations are within the scope of the present disclosure.

Moreover, while many of the illustrations and examples provided herein pertain to revenue portions and tax portions of particular transactions, it should be noted that, in certain implementations, different and/or additional charges or portions of a particular transaction are similarly contemplated. For example, in certain settings where a personal service is included (e.g., a waiter/waitress in a restaurant setting or a driver in a taxi setting), a tip or gratuity portion can be included in addition to a revenue portion and a tax portion of the sales transaction. Accordingly, it should be understood that such a gratuity/tip portion of a sales transaction can be separated or otherwise segregated substantially in the manner described herein. In doing so, instead of co-mingling such gratuity/tip portions (to which particular employees are entitled) with revenue portions (to which the merchant is entitled) of one or more particular transaction(s), such gratuity/tip portions can be separated into a separate account (e.g., an account under the control of a particular employee or employees) or otherwise segregated into a sub-account of the merchant, thereby increasing accountability and/or security with respect to such funds.

At step 280, the separator module executes to provide to the transaction processor 130 two data sets, one designated to each of the first and second accounts. For instance, the separator module can include a routing number and an account number associated with each of the first and second accounts to the transaction processor 130. The transaction processor is thereby enabled to settle the transactions in the separated sales files to distinct accounts free of any co-mingling of sales tax with sales revenue.

The revenue settlement module and the tax settlement module each are preferably in communication with a database so that the transmission to the transaction processor 130 can forward data useful in settling the sales transactions. In one implementation, the communication to a database comprises the communication of the sales file message from the machine 110 of the merchant to the separator module 150. The sales file or database can provide an identifier of the first account; an identifier of the merchant that caused the transmission; an amount of the revenue portion of the one or more approved sales transactions; an amount of the sales tax associated with the one or more approved sales transactions; a date for each respective one of the one or more approved sales transactions; a time for each respective one of the one or more approved sales transactions; and/or a selection of these data.

At step 290, the third-party transaction processor receives from the separator module 150 one or more data sets, such as one data set concerning a revenue portion of one or more sales transactions and a sales tax portion of the same group of sales transactions. Referring again to the example in FIG. 3, if the communication from the separator module 150 is of one sales transaction rather than a batch of transactions, then the POS provides a sales file to the separator module and the separator module operates to output a divided or otherwise identified version of the sales file with portions suitable for settling both the sales revenue portion (arrow 152) and the sales tax portion (arrow 154). For instance, instead of settling the amount in the "Total" field as received from the POS, the fields can be remapped so that the Total, which is used by the transaction processor 130 has, in the case of the revenue portion, the sum of the Amt and Tip columns (and thus excludes the Tax column), and, in the case of the sales tax portion, the Tax column. In another implementation, the fields are unaltered, but the pertinent fields are identified to the transaction processor for settlement (that is, there is no re-mapping of the columnar data). In still another implementation, the Tax column data is omitted to cause a recalculation of the Total for use in settling the revenue portion of the sales transaction(s), and the Amt and Tip column data are omitted to cause a recalculation of the Total for use in settling the sales tax portion of the sales transaction(s).

Regardless of the approach taken, the transaction processor settles the sales transaction(s) so that, at step 292, the merchant account can receive the revenue portion (arrow 134) and so that the second account 160 (e.g., tax account) can receive the sales tax component (arrow 132) of the sales transaction(s) at step 294. As such, the revenue settlement module and the tax settlement module can be understood as being configured, in accordance with various aspects described herein, to settle the revenue portion of the one or more approved sales transactions and/or the sales tax associated with the one or more approved sales transactions free of any comingling of those respective portions of the amount tendered by customer in each closed sales transaction.

As a consequence, the second account has access to monies associated with a tax portion of the sales transactions at a merchant location substantially contemporaneously with the merchant having access to the monies. When the second account is one belonging to a taxing authority, the taxing authority obtains access to tax revenue on a daily, weekly, bi-weekly, or monthly basis rather than a quarterly basis. The merchant, meanwhile can be accorded read access to the second account, or another account that is linked to payments made through the second account, so as to monitor the amount of payments made, say, in a given calendar quarter, and so on.

Moreover, in certain implementations, a tax authority can implement a single account (e.g., the 'second account' referenced above) having one or more sub-accounts, with each sub-account corresponding to a particular merchant. Accordingly, while the respective tax portions of various sales transactions can be deposited or otherwise credited to a single account (i.e., an account under the control of a taxing authority), the contributions made by a particular merchant can be segregated into a sub-account of such an account that corresponds to the particular merchant. In doing so, the taxing authority can effectively generate tax revenue in real-time, and thereby greatly reduce the need for auditing or pursuit of tax-evading merchants. Moreover, in certain implementations, such sub-account can be configured to enable review of/access to a particular sub-account by the corresponding merchant. For example, a merchant can be provided the ability to view the contents of its corresponding sub-account within which the tax portions of transactions generated by the merchant are segregated. In doing so, the merchant is provided with the ability to audit and/or otherwise account for the tax portions of such transactions. In addition, an audit trail or other such log can be maintained with respect to the tax portions that are credited to the single account/the sub-accounts. In doing so, a merchant can reconcile the total price of a sales transaction (e.g., both the revenue portion and the tax portion) initially charge with the revenue portion that is returned to the merchant. It should also be noted that, as can be appreciated by those of ordinary skill in the art, the various operations described herein can be easily configured for implementation in such settings, and such configurations are within the scope of the present disclosure.

While certain features of the various systems and methods described herein have been described as occurring on a particular machine, it would be understood by one of ordinary skill in the art that the functions described herein can be performed by various machines, interconnected, and distributed over a network. The determination of which machines perform specific functions is determined by the specific software implementation and supported hardware platforms. Accordingly, implementations of the disclosed technologies can operate in a centralized environment, wherein a server is responsible for substantially all processing, and the clients display the virtual environment and communicate user-interaction to the server. Alternatively, in certain implementations the systems and methods can also be practiced in a peer-to-peer environment having little or no centralized processing, wherein the state of each client is shared with its peers as necessary and the simulation of the virtual environment is distributed across the peer network.

At this juncture, it should be noted that although much of the foregoing description has been directed to systems and methods for transaction processing, the systems and methods disclosed herein can be similarly deployed and/or implemented in scenarios, situations, and settings far beyond the illustrated scenarios, such as in practically any scenario where any/all of the operation described herein can be useful. It should be further understood that any such implementation(s) and/or deployment(s) are within the scope of the systems and methods described herein.

It is to be understood that like numerals in the drawings represent like elements through the several figures, and that not all components and/or steps described and illustrated with reference to the figures are required for all embodiments or arrangements. It should also be understood that the embodiments, implementations, and/or arrangements of the systems and methods disclosed herein can be incorporated as a software algorithm, application, program, module, or code residing in hardware, firmware and/or on a computer useable medium (including software modules and browser plug-ins) that can be executed in a processor of a computer system or a computing device to configure the processor and/or other elements to perform the functions and/or operations described herein. It should be appreciated that according to at least one embodiment, one or more computer programs, modules, and/or applications that when executed perform methods of the present invention need not reside on a single computer or processor, but can be distributed in a modular fashion amongst a number of different computers or processors to implement various aspects of the systems and methods disclosed herein.

Thus, illustrative embodiments and arrangements of the present systems and methods provide a computer implemented method, computer system, and computer program product for transaction processing. The flowchart and block diagrams in the figures illustrate the architecture, functionality, and operation of possible implementations of systems, methods and computer program products according to various embodiments and arrangements. In this regard, each block in the flowchart or block diagrams can represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed is:

1. A transaction processing system suitable for processing transactions, the system comprising:
   a processor;
   a memory;
   a separator module accessible over a network and comprising code that when executed by the processor, configures the processor to receive a sales file over the network concerning one or more transactions provided from a merchant machine and to separate corresponding tax and revenue portions associated with each of the one or more transactions in the sales file, the separator module including:
      a revenue settlement module operative to configure the processor to provide a first data set to a transaction processor, the first data set identifying a revenue portion of each of the one or more of the transactions and designated to a first account associated with the merchant, and
      a tax settlement module operative to configure the processor to provide a second data set to the transaction processor, the second data set identifying a tax portion of each of the one or more of the transactions and designated to a second account being different than the first account; and
   wherein the transaction processor receives and processes the first data set and the second data set to settle the one or more transactions by directing the revenue portion identified by the first data set to the first account and to directing the tax portion identified by the second data set to the second account free of co-mingling.

2. The transaction processing system of 1, wherein the separator module is a hosted solution that merchants can subscribe to.

3. The transaction processing system of claim 1, wherein the revenue settlement module settles the revenue portion of plural transactions of the one or more transactions simultaneously in a batch.

4. The transaction processing system of claim 1, wherein the tax settlement module settles the tax portion of plural transactions of the one or more transactions simultaneously in a batch.

5. The transaction processing system of claim 1, further comprising a database in communication with the tax settlement module, wherein the sales file received over the network includes data from the database comprising: an identifier of the second account; an identifier of the merchant that caused the sales file to be received; and a date for each respective one of the one or more transactions.

6. The transaction processing system of claim 1, wherein the separator module configures the processor to remap one or more fields in the sales file received over the network such that a total-field within the sales file comprises a sum of an amount column and a tip column for the received one or more transactions.

7. The transaction processing system of claim 1, the separator module configures the processor to remap one or more fields in the sales file received over the network such that a total-field within the sales file comprises a sum of a tax column for the received one or more transactions.

8. The transaction processing system of claim 1, wherein the separator module configures the processor to recalculate a total field-within the sales file received over the network such that the total-field comprises a sum of an amount column and a tip column for the received one or more transactions, and omits from recalculation a tax column for the one or more transactions.

9. The transaction processing system of claim 1, wherein the separator module configures the processor to recalculate a total-field within the sales file received over the network such that the total-field comprises a sum of a tax column for the one or more transactions, and omits from the recalculation an amount column and a tip column for the one or more transactions.

10. The transaction processing system of claim 1, wherein the second account is associated with a taxing authority, and wherein the tax settlement module is further operative to configure the processor to effect the settlement on an automated basis.

11. The transaction processing system of claim 1, wherein the revenue settlement module settles the revenue portion associated with each of the one or more transactions to the second account on a per-transaction basis.

12. The transaction processing system of claim 1, wherein the tax settlement module settles the tax associated with each of the one or more transactions to the second account on a per-transaction basis.

* * * * *